(12) United States Patent
Chang et al.

(10) Patent No.: US 10,085,039 B2
(45) Date of Patent: Sep. 25, 2018

(54) METHOD AND APPARATUS OF VIRTUAL DEPTH VALUES IN 3D VIDEO CODING (71) Applicant: HFI Innovation Inc., Zhubei, Hsinchu County (TW)

(72) Inventors: Yu-Lin Chang, Taipei (TW); Yu-Pao Tsai, Kaohsiung (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 287 days.

(21) Appl. No.: 14/429,498

(22) PCT Filed: Sep. 17, 2013

(86) PCT No.: PCT/CN2013/083659
§ 371 (c)(1),
(2) Date: Mar. 19, 2015

(87) PCT Pub. No.: WO2014/044168
PCT Pub. Date: Mar. 27, 2014

(65) Prior Publication Data
US 2015/0249838 A1 Sep. 3, 2015

Related U.S. Application Data (60) Provisional application No. 61/703,901, filed on Sep. 21, 2012, provisional application No. 61/711,314, filed on Oct. 9, 2012.

(51) Int. Cl.
*H04N 11/02* (2006.01)
*H04N 19/597* (2014.01)
(Continued)

(52) U.S. Cl.
CPC ........... *H04N 19/597* (2014.11); *H04N 19/56* (2014.11); *H04N 19/521* (2014.11)

(58) Field of Classification Search
CPC .................................................. H04N 19/597
(Continued)

(56) References Cited

U.S. PATENT DOCUMENTS 6,055,274 A 4/2000 McVeigh
6,691,275 B1 * 2/2004 Jaeckel ................. H03M 5/145
341/59

(Continued)

FOREIGN PATENT DOCUMENTS

CN 102257818 11/2011
CN 102510500 6/2012
(Continued)

OTHER PUBLICATIONS

Tech, G., et al.; "3D-HEVC test Model 1;" Joint Collaborative Team on 3D Video Coding Extension Development of ITU-T SG 16 WP 3 and ISO/IEC JTC 1/SC 29/WG 11; Jul. 2012; pp. 1-82.
(Continued)

*Primary Examiner* — Leron Beck
(74) *Attorney, Agent, or Firm* — Oblon, McClelland, Maier & Neustadt, L.L.P.

(57) ABSTRACT

A method and apparatus for three-dimensional video coding using the virtual depth information are disclosed. For a current texture block in the dependent view, the method incorporating the present invention first derives an estimated disparity vector to locate a corresponding texture block in a coded view. A collocated depth block in the coded view collocated with the corresponding texture block in the coded view is identified and used to derive the virtual depth information. One aspect of the present invention addresses derivation process for the estimated disparity vector. Another aspect of the present invention addresses the usage of the derived virtual depth information.

22 Claims, 6 Drawing Sheets (51) Int. Cl.
*H04N 19/56* (2014.01)
*H04N 19/513* (2014.01)

(58) Field of Classification Search
USPC ........................................ 375/240.01–240.29
See application file for complete search history.

(56) References Cited

U.S. PATENT DOCUMENTS

| | | | |
|---|---|---|---|
| 8,139,150 B2* | 3/2012 | Nakamura | H04N 19/597 348/409.1 |
| 8,532,410 B2 | 9/2013 | Tian et al. | |
| 8,953,684 B2* | 2/2015 | Cai | H04N 19/597 375/240.16 |
| 9,258,562 B2* | 2/2016 | Zhang | H04N 19/597 |
| 9,319,657 B2* | 4/2016 | Kang | H04N 13/0048 |
| 2011/0069760 A1 | 3/2011 | Lee et al. | |
| 2011/0096832 A1* | 4/2011 | Zhang | H04N 13/0022 375/240.08 |
| 2011/0142138 A1* | 6/2011 | Tian | H04N 13/0022 375/240.24 |
| 2011/0216833 A1 | 9/2011 | Chen et al. | |
| 2013/0287093 A1* | 10/2013 | Hannuksela | H04N 19/00769 375/240.02 |
| 2014/0341289 A1* | 11/2014 | Schwarz | H04N 19/597 375/240.16 |

FOREIGN PATENT DOCUMENTS

| | | |
|---|---|---|
| EP | 2 348 732 | 7/2011 |
| JP | 2011519226 | 6/2011 |
| JP | 2012080242 | 4/2012 |
| WO | WO 2013/138621 | 9/2013 |
| WO | WO 2013/184468 | 12/2013 |
| WO | WO 2013/188784 | 12/2013 |
| WO | WO 2014/000664 | 1/2014 |
| WO | WO 2014/043374 | 3/2014 |

OTHER PUBLICATIONS

Tian, D., et al.; "CE1.h Backward view synthesis prediction using neighbouring blocks;" Joint Collaborative Team on 3D Video Coding Extension Development of ITU-T SG 16 WP 3 and ISO/IEC JTC 1/SC 29/WG 11; Jan. 2013; pp. 1-6.

Oh, J.D., et al.; "Stereo Matching via disparity estimation and surface modeling;" IEEE; 2007; pp. 1-8.

Yea, S., et al.; "Report of CE10 on View Synthesis Prediction;" Joint Video Team (JVT) of ISO/IEC MPEG & ITU-T VCEG (ISO/IEC JTC1/SC29/WG11 and ITU-T SG16 Q.6); Oct. 2006; pp. 1-6.

Wu, C.L., et al.; "3D-CH1.a related inter-view skip mode with sub-partition scheme;" Joint Collaborative Team on 3D Video Coding Extension Development of ITU-T SG 16 WP 3 and ISO/IEC JTC 1/SC 29/WG 11; Jul. 2012; pp. 1-4.

Iyer, K.N., et al.; "Multiview video coding using depth based 3d warping;" IEEE; 2010; pp. 1108-1113.

Bartnik, C., et al.; "HEVC Extension for Multiview Coding and Multiview Video plus Depth Coding;" ITU-Telecommunications Standardization Sector; Feb. 2012; pp. 1-42.

Zhang, L., et al; "3D-CE5.h related Bug Fix for independent estimated depth maps of non-base views in CTC;" Joint Collaborative Team on 3D Video Coding Extension Development of ITU-T SG 16 WP 3 and ISO/IEC JTC 1/SC 29/WG 11; Jul. 2012; pp. 1-5.

Zhang, L., et al.; "3D-CE5.h related Improved merge mode for inter-view predicted motion;" Joint Collaborative Team on 3D Video Coding Extension Development of ITU-T SG 16 WP 3 and ISO/IEC JTC 1/SC 29/WG 11; Jul. 2012; pp. 1-4.

Chang, Y.L., et al.; "3D-CE5.h related Depth-orientedNeighboring Block Disparity Vector (DoNBDV) with virtual depth;" Joint Collaborative Team on 3D Video Coding Extension Development of ITU-T SG 16 WP 3 and ISO/IEC JTC 1/SC 29/WG 11; Oct. 2012; pp. 1-5.

Chang, Y.L.; "CE1.H Depth-oriented Neighboring Block Disparity Vector (DoNBDV) with virtual depth retrieval;" Joint Collaborative Team on 3D Video Coding Extension Development of ITU-T SG 16 WP 3 and ISO/IEC JTC 1/SC 29/WG 11; Jan. 2013; pp. 1-5.

Chang, Y.L., et al.; "3D-CE2.H related Simplified DV derivation for DoNBVD and BVSP;" Joint Collaborative Team on 3D Video Coding Extension Development of ITU-T SG 16 WP 3 and ISO/IEC JTC 1/SC 29/WG 11; Apr. 2013; pp. 1-4.

English language translation of abstract of CN 102257818 (published Nov. 23, 2011).

English language translation of abstract of CN 102510500 (published Jun. 20, 2012).

* cited by examiner

METHOD AND APPARATUS OF VIRTUAL DEPTH VALUES IN 3D VIDEO CODING

CROSS REFERENCE TO RELATED APPLICATIONS

The present invention is a National Stage Application of PCT Application Ser. No. PCT/CN2013/083659, which claims priority to U.S. Provisional Patent Application Ser. No. 61/703,901, filed on Sep. 21, 2012, entitled "Method to Retrieve Depth Values for 3D Video Coding" and U.S. Provisional Patent Application Ser. No. 61/711,314, filed on Oct. 9, 2012, entitled "Method to Predict Motion Vector for 3D Video Coding". The U.S. Provisional Patent Applications are hereby incorporated by reference in their entireties

TECHNICAL FIELD

The present invention relates to three-dimensional video coding. In particular, the present invention relates to derivation of virtual depth values for 3D video coding.

BACKGROUND

Three-dimensional (3D) television has been a technology trend in recent years that intends to bring viewers sensational viewing experience. Various technologies have been developed to enable 3D viewing. Among them, the multi-view video is a key technology for 3DTV application among others. The traditional video is a two-dimensional (2D) medium that only provides viewers a single view of a scene from the perspective of the camera. However, the multi-view video is capable of offering arbitrary viewpoints of dynamic scenes and provides viewers the sensation of realism.

The multi-view video is typically created by capturing a scene using multiple cameras simultaneously, where the multiple cameras are properly located so that each camera captures the scene from one viewpoint. Accordingly, the multiple cameras will capture multiple video sequences corresponding to multiple views. In order to provide more views, more cameras have been used to generate multi-view video with a large number of video sequences associated with the views. Accordingly, the multi-view video will require a large storage space to store and/or a high bandwidth to transmit. Therefore, multi-view video coding techniques have been developed in the field to reduce the required storage space or the transmission bandwidth.

A straightforward approach may be to simply apply conventional video coding techniques to each single-view video sequence independently and disregard any correlation among different views. Such coding system would be very inefficient. In order to improve efficiency of multi-view video coding (MVC), typical multi-view video coding exploits inter-view redundancy. Therefore, most 3D Video Coding (3DVC) systems take into account of the correlation of video data associated with multiple views and depth maps. The MVC adopts both temporal and spatial predictions to improve compression efficiency. During the development of MVC, some macroblock-level coding tools are proposed, including illumination compensation, adaptive reference filtering, motion skip mode, and view synthesis prediction. These coding tools are proposed to exploit the redundancy between multiple views. Illumination compensation is intended for compensating the illumination variations between different views. Adaptive reference filtering is intended to reduce the variations due to focus mismatch among the cameras. Motion skip mode allows the motion vectors in the current view to be inferred from the other views. View synthesis prediction is applied to predict a picture of the current view from other views.

In the MVC, however, the depth maps and camera parameters are not coded. In the recent standardization development of new generation 3D Video Coding (3DVC), the texture data, depth data, and camera parameters are all coded. Due to existence of the depth data and camera parameters in the new-generation 3D Video Coding (3DVC) technology, the relationship between the texture images and depth maps need to be studied to further improve compression capability. The depth maps and texture images have high correlation since they all correspond to the same geometry. The redundancy between the texture data and the depth data can be exploited via the corresponding correlation. For example, the depth maps may help the texture image compression with higher coding gain or less coding time. Furthermore, the depth maps can be converted to present the correspondence pairs in the texture images, which benefits inter-view prediction process.

In 3D video coding, the coding order of texture data and depth data is always an issue because of the redundancy between texture and depth. During the early standard development of 3D video coding, the coding order is chosen as coding the depth data before the texture data in the dependent views for AVC-based 3D video coding (3D-AVC). However, the coding order is chosen as coding the texture data before the depth data in the dependent views for HEVC-based 3D video coding (3D-HEVC). A technique to allow flexible coding order has been disclosed in the literature that changes the coding order for 3D-HEVC. The coding efficiency for texture can be improved by referring to the depth information. The depth information helps to improve the coding efficiency in many different ways. Depth-based motion vector prediction (DMVP) in 3D-AVC uses the coded depth to improve the accuracy of the motion vector prediction. The depth map helps to identify inter-view candidate for motion parameter prediction. View Synthesis Prediction (VSP) is a popular topic which identifies the inter-view reference from the frames warped from other views. In view synthesis prediction, the texture data and depth data of a first view are coded/decoded first. A second view can be predicted by warping the first view to the second view position. The depth map helps the texture picture to be warped to a correct position.

Coding tools such as motion vector inheritance and inter-view motion parameter prediction further utilize the depth information to improve the prediction of the current block. In the recent development of 3DVC standard, a predicted depth map (PDM) algorithm has been disclosed to provide depth information for current texture image. The predicted depth map is derived from coded disparity vector or warped from the depth map of the coded view. The current block can be coded by the motion parameters derived from the predicted depth map. A neighboring block disparity vector (NBDV) has been disclosed in the literature. NBDV uses the disparity vector (DV) from inter-view prediction in the neighboring block to improve the motion vector prediction. While NBDV replaces the earlier method based on PDM, however, depth information is still proved to be useful in 3D-AVC. Since the depth information can be useful for improving the coding efficiency, the method to retrieve depth information for the current block becomes important. It is desirable to develop a method to generate virtual depth information for three-dimensional video coding.

SUMMARY

A method and apparatus for three-dimensional video encoding or decoding using the virtual depth information are disclosed. For a current texture block in the dependent view, the method incorporating the present invention first derives an estimated disparity vector to locate a corresponding texture block in a coded view. A collocated depth block in the coded view collocated with the corresponding texture block in the coded view is identified and used to derive the virtual depth information. One aspect of the present invention addresses derivation process for the estimated disparity vector. The estimated disparity vector can be derived based on disparity vector candidates of the current texture block in the dependent view. The disparity vector candidates can be derived from spatial or temporal neighboring blocks of the current texture block in the dependent view, or one or more spatial or temporal neighboring blocks of a temporal collocated texture block corresponding to the current texture block, wherein the spatial or temporal neighboring blocks are disparity compensation predicted (DCP) blocks, or disparity vector motion compensated predicted (DV-MCP) blocks. For example, the disparity vector candidate may correspond to the average, maximum, minimum, or median of all disparity vectors or a portion of disparity vectors in said one or more spatial or temporal neighboring blocks. The disparity vector candidate may be derived from a coded global geometry model of the dependent view.

The estimated disparity vector can be determined from the disparity vector candidates according to a search order. In another embodiment, the derivation process for the estimated disparity vector comprises selecting an initial disparity vector from the disparity vector candidates to retrieve a depth reference block in the coded view; extracting a second disparity vector from the depth reference block, wherein the second disparity vector points to a first location in the dependent view from the corresponding texture block in the coded view; determining consistency error between the initial disparity vector and the second disparity vector; and selecting one disparity vector candidate from the disparity vector candidates that results in a minimal consistency error as the estimated disparity vector. In yet another embodiment, the derivation process for the estimated disparity vector comprises retrieving a depth reference block in the coded view corresponding to one disparity vector candidate; extracting a converted disparity vector from the depth reference block; determining consistency error between the converted disparity vector and said one disparity vector candidate; and selecting one converted disparity vector with a minimal consistency error as the estimated disparity vector.

Another aspect of the present invention addresses the usage of the derived virtual depth information. In one application, the derived virtual depth information is used for view synthesis prediction to derive sub-block disparity vectors for sub-blocks resulted from partitioning a current texture block. In another application, a motion vector predictor or a disparity vector predictor is derived from the virtual depth information and used for encoding or decoding of the current texture or depth block coded in Merge mode or Skip mode. The partition of the current texture or depth block can be inherited or derived from the virtual depth information. In yet another application, the virtual depth information can be used to derive a reference block for coding the current texture or depth block using inter-view motion compensation. The virtual depth information may also be used to derive a disparity vector for inter-view motion prediction of the current texture or depth block. An inter-view disparity vector may be retrieved from the virtual depth information for inter-view residual prediction of residual data associated with the current texture or depth block.

DETAILED DESCRIPTION

In this invention, a virtual depth retrieval method to eliminate the use of an actual depth map associated with a current texture picture. Instead, the depth values are derived using prediction based previously coded depth data. The derived depth values are referred to as virtual depth values in this disclosure. The virtual depth retrieval method consists of the following steps:
1. Using an estimated disparity vector to locate a texture block in the coded view corresponding to the current block (CB), and
2. Using the collocated depth of the coded view as the virtual depth for the current block.

Figure 1:
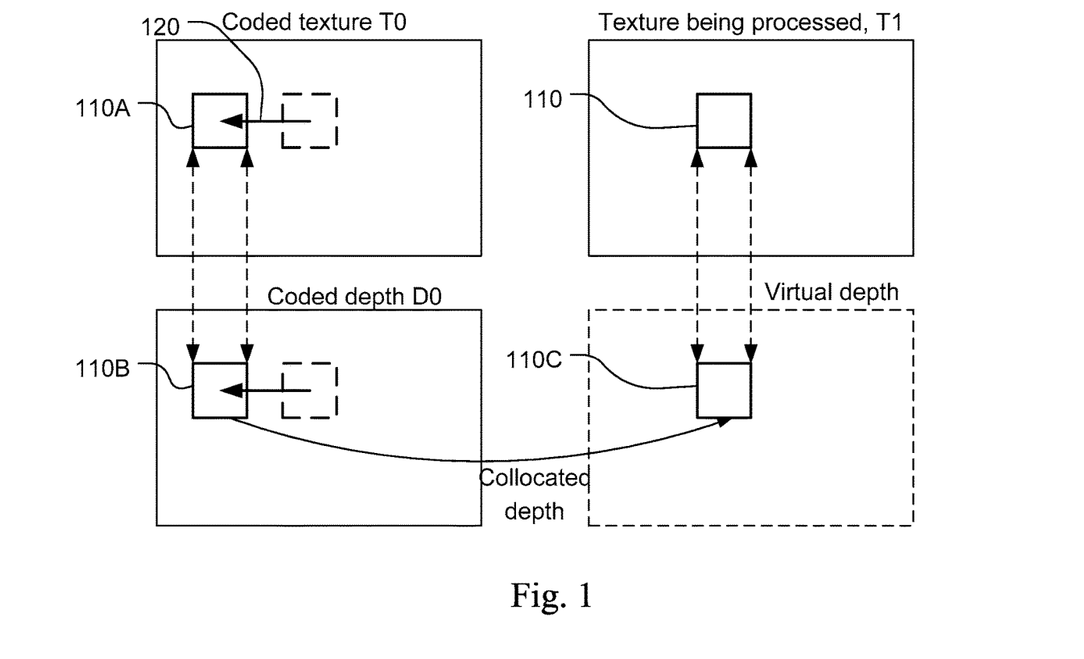
FIG. 1 illustrates an example of virtual depth information derivation according to an embodiment of the present invention.

A virtual depth derivation process according to the present invention is shown in FIG. 1. The coded texture picture and coded depth map in view 0 are denoted as T0 and D0 respectively. The texture to be coded in view 1 is denoted as T1. The current block (CB) to be coded is denoted as block 110 in T1. An estimated disparity vector 120 is used to locate a corresponding block (110A) in coded texture T0. The dashed box in T0 corresponds to the location of block 110. Block 110A in T0 is then used to locate depth block 110B in coded view D0. Depth data associated with depth block 110B is then to derive virtual depth block 110C for the current texture picture T1. Derived virtual depth block 110C can also be used for the current depth map D1.

Figure 2:
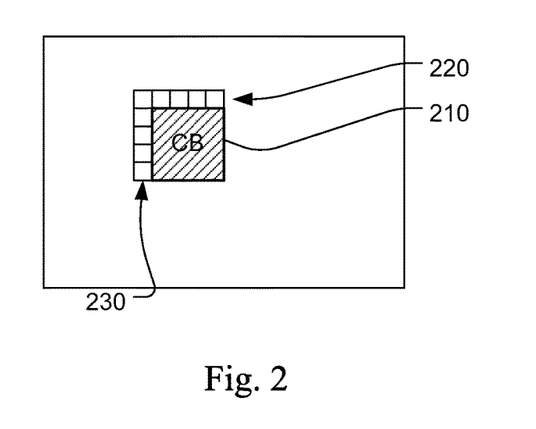
FIG. 2 illustrates an example of neighboring blocks associated with a current block for determining disparity vector candidates.

There are various procedures to derive the estimated disparity vector. For example, the estimated disparity vectors can be derived from disparity vector candidates, where the disparity vector candidates can be obtained from the spatial/temporal neighboring blocks, where the neighboring blocks are disparity compensation predicted (DCP) blocks, spatial/temporal neighboring disparity vector motion compensated predicted (DV-MCP) blocks, or a set of coded disparity vectors or a global model describing the rough geometry of the scene of current view. The global geometry model may correspond to coded disparity or depth vectors. The global geometry model may also correspond to coded rough mesh model. When a disparity vector candidate associated with a neighboring block is not available, a default disparity vector can be used. An example of the neighboring blocks of the current block is shown in FIG. 2, where block 210 corresponds to the current block, blocks 220 correspond to neighboring blocks on the upper side of the current block, and blocks 230 correspond to neighboring blocks on the left side of the current block. The neighboring blocks may also include temporal collocated neighboring blocks. Furthermore, the neighboring blocks may also include neighboring blocks of a temporal collocated block. The disparity vector can be derived based on the average, maximum, minimum, or median of all or a portion of the disparity vector candidates.

After the disparity vector candidates are determined, a similarity checking process can be performed on the disparity vector candidates. The process is to check whether a selected disparity vector candidate is similar to the neighboring disparity vector candidate of the block on the upper side of the current block or on the left side of the current block. The disparity vector candidate with highest similarity among the neighboring blocks can be used as the estimated disparity vector. For example, if the disparity vector candidate of the upper-left neighboring block is more similar to the disparity vector candidate of the upper neighboring block than the disparity vector candidate of the left neighboring block, the disparity vector candidate of the upper neighboring block is selected as the estimated disparity vector; and otherwise, the disparity vector candidate of the left neighboring block is selected as the estimated disparity vector.

Once the disparity vector candidates are determined, a final disparity vector used to retrieve the virtual depth will be derived from the disparity vector candidates. There are many ways to derive the final estimated disparity vector. Three exemplary derivation processes of the estimated disparity vector are disclosed as follows.

Figure 3:
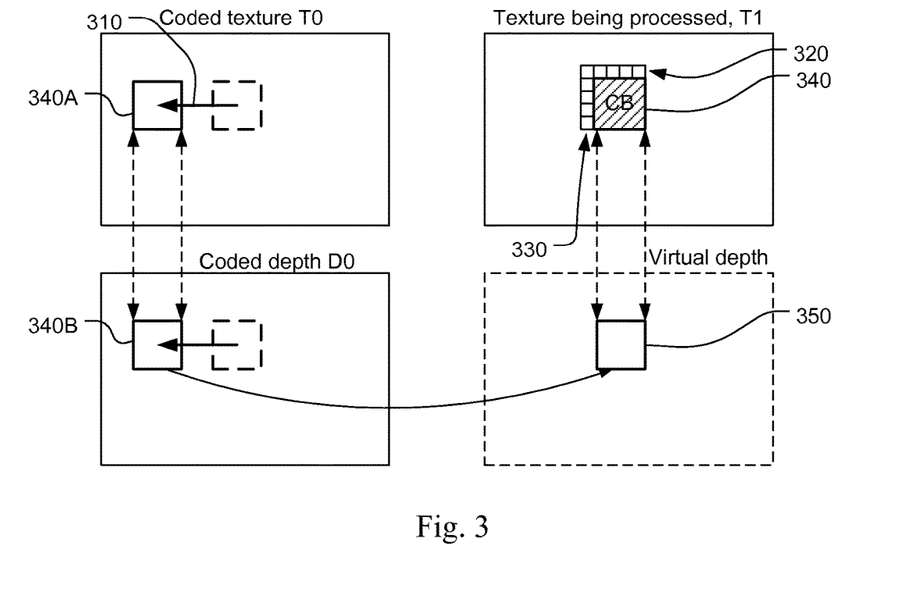
FIG. 3 illustrates an example of estimated disparity vector derivation, where the estimated disparity vector is determined from the disparity vector candidates according to a search order.

The first example of derivation of the estimated disparity vector is shown in FIG. 3, where the estimated disparity vector (310) is determined from the disparity vector candidates associated with the neighboring blocks (320 and 330) of the current block (340) according to a search order. The disparity vector candidates are checked according to the search order and the first existing disparity vector candidate will be selected as the estimated disparity vector. The search order can be pre-defined. A texture block (340A) in the coded texture T0 corresponding to the current block (340) can be located using the estimated disparity vector (310). A collocated depth block (340B) in coded depth D0 can be located and the collocated depth block (340B) is used to derive the virtual depth data (350) for the current texture block in the current texture T1. The collocated depth block (340B) in coded depth D0 can be used directed as virtual depth by the current dependent view. Alternatively, collocated depth block (340B) in coded depth D0 can be warped or transformed to obtain the virtual depth information. For example, an affine transform may be used to transform the collocated depth block to the virtual depth information. The dashed boxes in coded T0 and D0 correspond to the location of the current block. While an exemplary set of neighboring blocks (320 and 330) are shown in FIG. 3, the neighboring blocks may also include one or more temporal collocated neighboring blocks. Other spatial neighboring block configurations may also be used.

Figure 4:
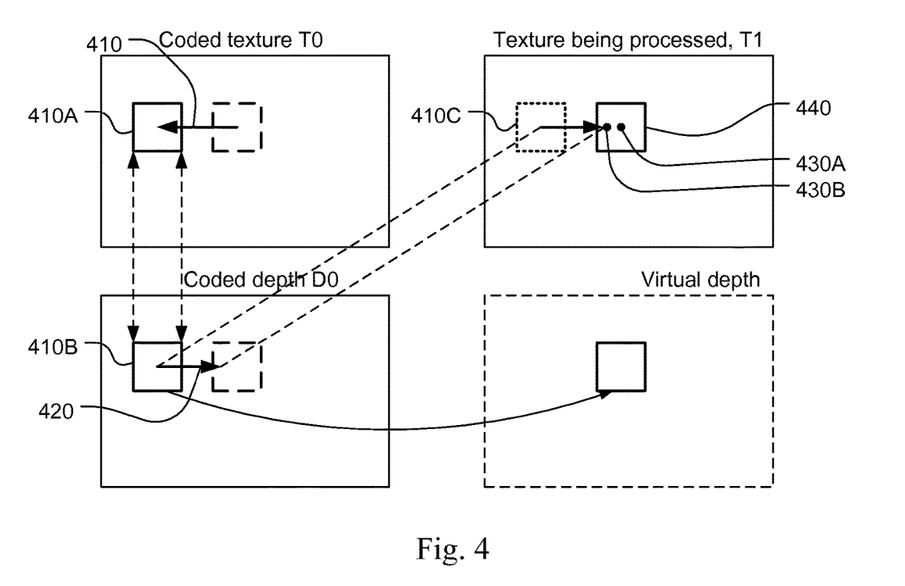
FIG. 4 illustrates an example of estimated disparity vector derivation, where the estimated disparity vector is determined from the disparity vector candidates having a smallest consistency error.

In the second example, the derivation of the estimated disparity vector selects an initial disparity vector, $v_i$ (410) from the disparity vector candidates to retrieve a depth reference block (410B) as shown in FIG. 4. The initial disparity vector 410 points to a corresponding block (410A) in the coded texture T0 corresponding to depth reference block 410B. A second disparity vector, $v_s$, (420) pointing to the current view is then extracted from the depth reference block 410B. The second DV can be extracted from the average, maximum, minimum, or median of all depth values or a portion of depth values in the depth reference. The dashed boxes in coded T0 and D0 correspond to the location of the current block. The dotted box (410C) in the current texture T1 corresponds to the location of the corresponding block (410A) in T0. A consistency check can be performed on the second disparity vector. The consistency error may correspond to the difference between the initial disparity vector and second disparity vector. Alternatively, the consistency error may correspond to distance between the center (430A) of the current block (440) and the corresponding position (430B) in the current view pointed by the second disparity vector (420). The disparity vector candidate that results in the minimal consistency error can be selected as the estimated disparity vector. Other types of consistency check may also be used to select the estimated disparity vector.

Figure 5:
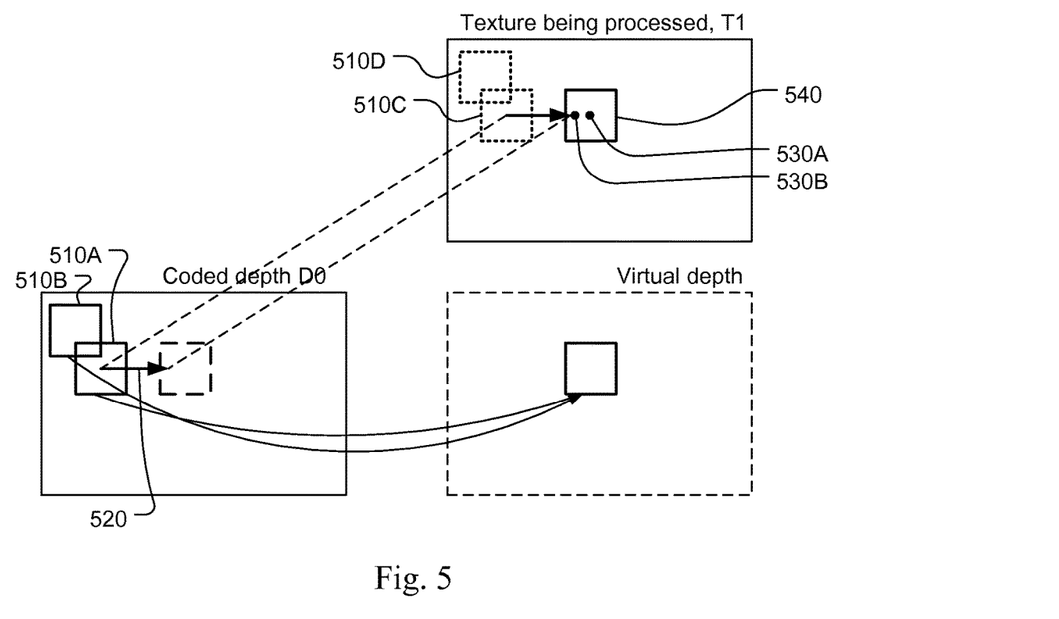
FIG. 5 illustrates an example of estimated disparity vector derivation, where the estimated disparity vector is determined based on extracted disparity vectors derived from the disparity vector candidates having a smallest consistency error.

In the third example, the derivation of the estimated disparity vector retrieves multiple depth reference blocks based on the disparity vector candidates as shown in FIG. 5. Two depth reference blocks (510A and 510B) are shown in the example of FIG. 5, where the two depth reference blocks are determined based on two corresponding disparity vector candidates (not shown in FIG. 5). The dotted boxes (510C and 510D) in the current texture T1 correspond to the locations of the corresponding blocks (510A and 510B) in T0. The disparity vectors can be then extracted from the depth reference blocks. The disparity vectors can be extracted based on the average, maximum, minimum, or median of all depth values or a portion of depth values in the depth reference blocks. FIG. 5 illustrates one disparity vector (520) is extracted from the depth reference blocks. Consistency check can be performed for each extracted disparity vector. Similar to the consistency check in the second example, the consistency error may correspond to the difference between the extracted disparity vector and a corresponding disparity vector candidate. Alternatively, the consistency error may correspond to the distance between the center (530A) of the current block (540) and the corresponding position (530B) in the current view pointed by the extracted disparity vector (520). The extracted disparity vector with the minimal consistency error is selected as the estimated disparity vector.

After the virtual depth information is obtained, the virtual depth information can be used by various coding tools or coding processes. The use of the virtual depth information in a three-dimensional coding system can be adaptively enabled or disabled according to an indication. For example, a flag can be used to indicate whether the use of the virtual depth information is enabled or not. The texture block or depth block may correspond to a picture region, an arbitrary shape or a pixel. Some exemplary usages of the virtual depth are shown as follows.

Application 1—Virtual View Synthesis Prediction

Figure 6:
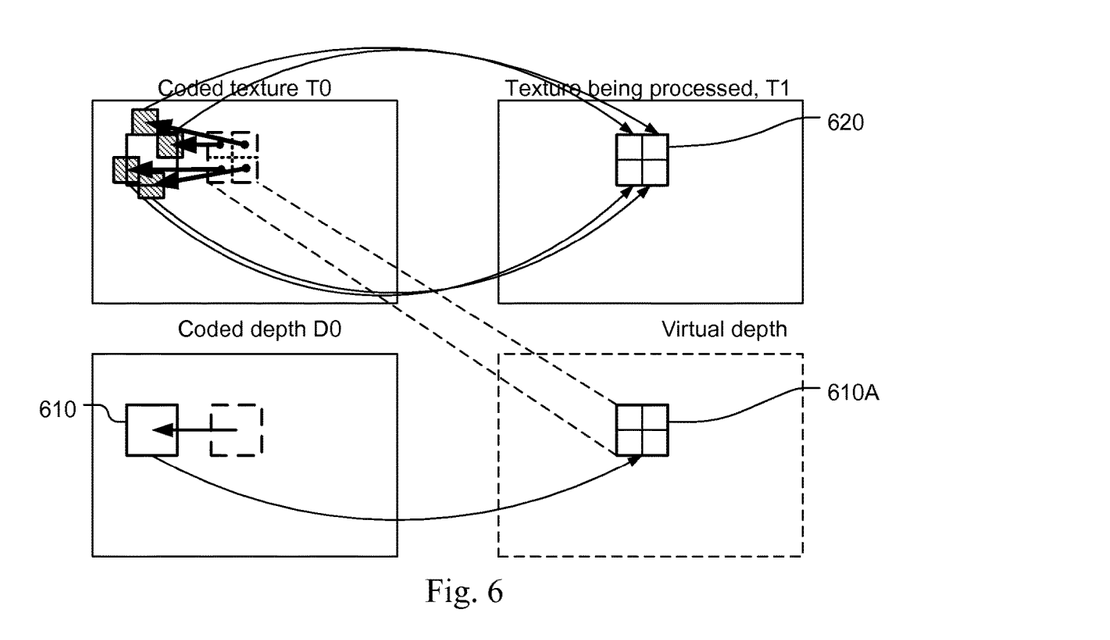
FIG. 6 illustrates an exemplary usage of the derived virtual depth information in view synthesis prediction, where sub-block disparity vectors for the sub-blocks are derived from the derived virtual depth information.

In view synthesis prediction, both the texture and depth information are required for view synthesis prediction. The virtual depth derived can be used as the depth information for view synthesis. The depth information can be retrieved by the aforementioned derivation processes. The backward mapping view synthesis locates the texture information in coded T0 according to the retrieved depth information. For example, in FIG. 6, the retrieved depth information (610) is used as the virtual depth reference (610A) by current texture block 620 to locate the texture information (as shown by shaded boxes in coded texture T0). The current texture block can be partitioned into multiple sub-blocks. The sub-block disparity vectors (shown as arrows in coded texture T0) can be derived from the corresponding virtual depth sub-blocks (610A). The backward mapping view synthesis can be carried out through the virtual depth and indicated texture information. The synthesized block can be used as a reference for prediction. The located texture information (as shown by shaded boxes in coded texture T0) corresponds to the synthesized block. Moreover, the virtual depth can be used to restrict the reference region for the forward mapping. Both the forward and backward mappings can be benefited from the virtual depth. The sub-block disparity vector can be determined based on the average, maximum, minimum, or median of all depth values or a portion of depth values within the collocated sub-block in the virtual depth map.

Application 2—Inter-View Motion Vector Prediction

Figure 7:
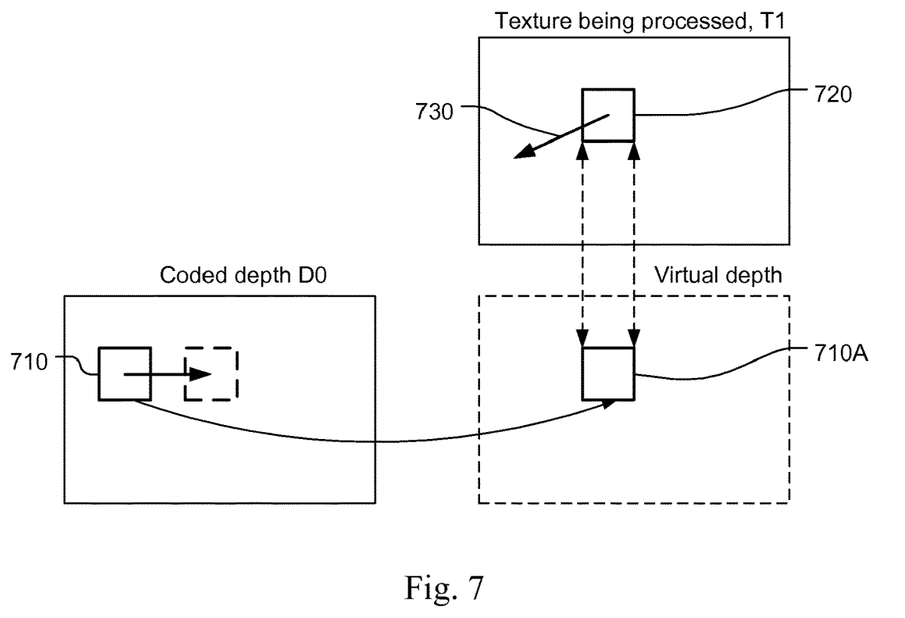
FIG. 7 illustrates an exemplary usage of the derived virtual depth information in inter-view motion prediction, where the disparity vector predictor is derived from the derived virtual depth information.

In the existing HEVC based 3D video coding, the motion prediction treats disparity compensation as inter-view motion compensation, which places the inter-view reference picture in the reference list and uses disparity vectors as motion vectors. An embodiment according to the present invention derives the disparity vector based on the virtual depth data as the motion vector. FIG. 7 illustrates an example of using the virtual depth to derive disparity vector predictor for inter-view motion vector prediction. A motion vector predictor can also be retrieved by using the disparity vector extracted from virtual depth to refer to the motion vector in the coded view. The disparity vector predictor (DVP) or the extracted disparity vector can be the maximum disparity, average disparity, or partial maximum disparity converted from the virtual depth. In some video coding systems, a list of motion vector predictor candidates is maintained and a final motion vector predictor is selected from the list. In this case, the extracted MVP or DVP can be used as a candidate. For example, the retrieved depth information (710) is used as the virtual depth reference (710A) by the current block (720) to locate the DVP (730).

Application 3—Partition Inheritance

Figure 8:
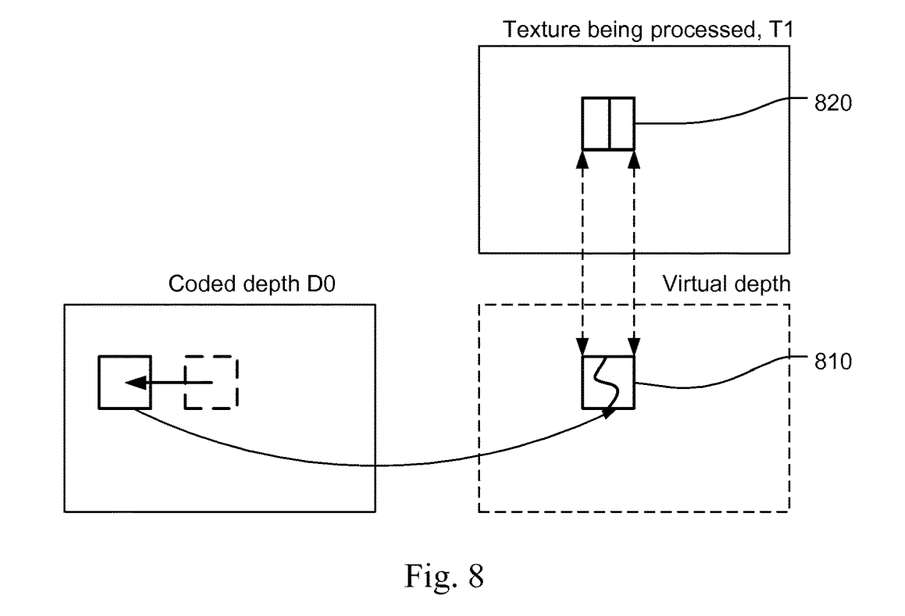
FIG. 8 illustrates an exemplary usage of the derived virtual depth information in texture block partition, where partition of the texture block is inherited or derived based on the derived virtual depth information.

As shown in FIG. 8, the partition of a current block can refer to the virtual depth to determine whether further splitting is required or not. If the virtual depth block can indicate partition is needed for the depth block, then further splitting is applied to current texture block. For example, if the virtual depth block (810) in FIG. 8 indicates that partition is required for the virtual depth block, the current texture block (820) is also partitioned. In another case, if the partition of the virtual depth is known, the partition of the current block can be inherited from the partition of the virtual depth. A flag may be used to indicate whether the inheritance of partition is used or not.

Application 4—Depth Coding Prediction

Figure 9:
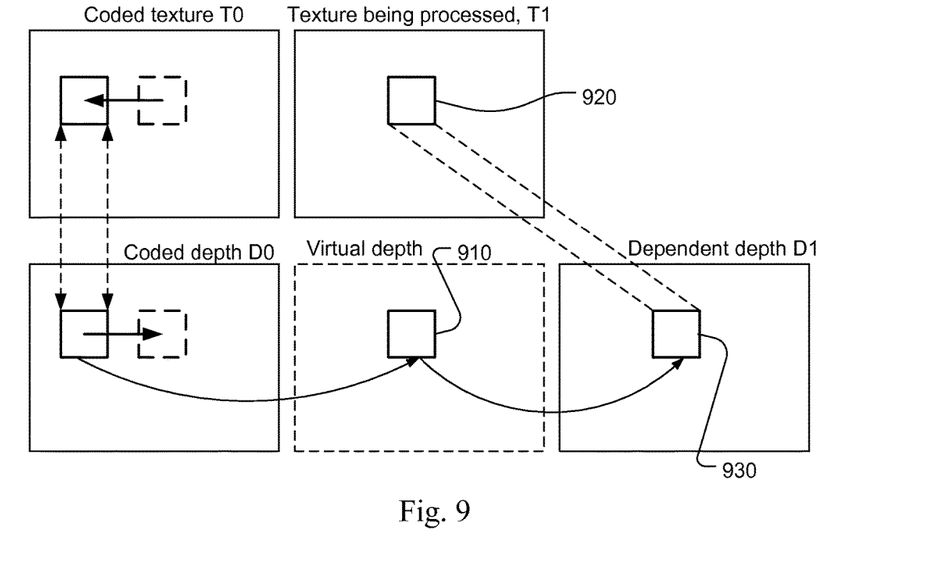
FIG. 9 illustrates an exemplary usage of the derived virtual depth information in Inter/inter-view prediction, where a reference block is located using the derived virtual depth information.

As shown in FIG. 9, a virtual depth block (910) can be found according to the disparity vector of the collocated texture block (920). The virtual depth block (910) can then be used as a reference for Inter/inter-view prediction of the depth block (930) in dependent depth D1.

Application 5—Depth Intra Prediction

Figure 10:
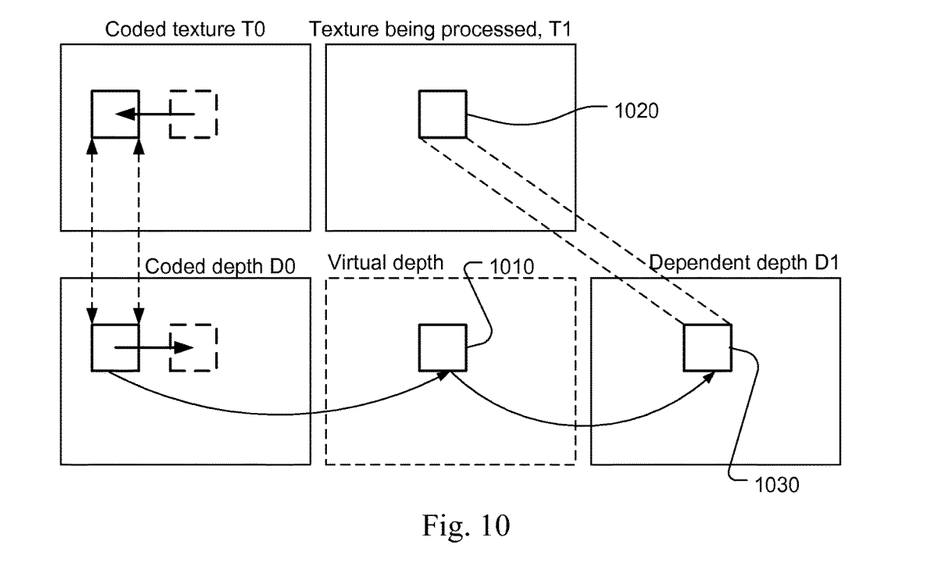
FIG. 10 illustrates an exemplary usage of the derived virtual depth information in depth Intra prediction or depth partition, where a virtual depth block is used as a predictor for the depth Intra prediction or depth partition.

As shown in FIG. 10, a virtual depth block (1010) can be found according to the disparity vector of the collocated texture block (1020). The virtual depth block (1010) can then be used as a predictor for depth Intra prediction or depth block partitioning of the depth block (1030) in dependent depth D1.

Application 6—Merge/Skip Mode

A subset of virtual depth can be used to derive the disparity vector for a temporal inter-view motion vector merging candidate in Merge/Skip mode. A texture or depth block being coded in Merge/Skip mode can refer to the virtual depth to determine a disparity vector predictor used for Merge/Skip mode.

Application 7—Inter-View Residual Prediction

In 3D-HEVC, inter-view residual prediction is used, where the residual information in a current view is predicted using reference data in a coded view according to an inter-view disparity vector. The inter-view disparity vector can be retrieved from the virtual depth. The inter-view disparity vector can be the maximum disparity, average disparity, or partial maximum disparity of the virtual depth. After the inter-view disparity vector is retrieved, the residual information can be predicted by the reference data in the coded view according to the derived disparity vector.

Figure 11:
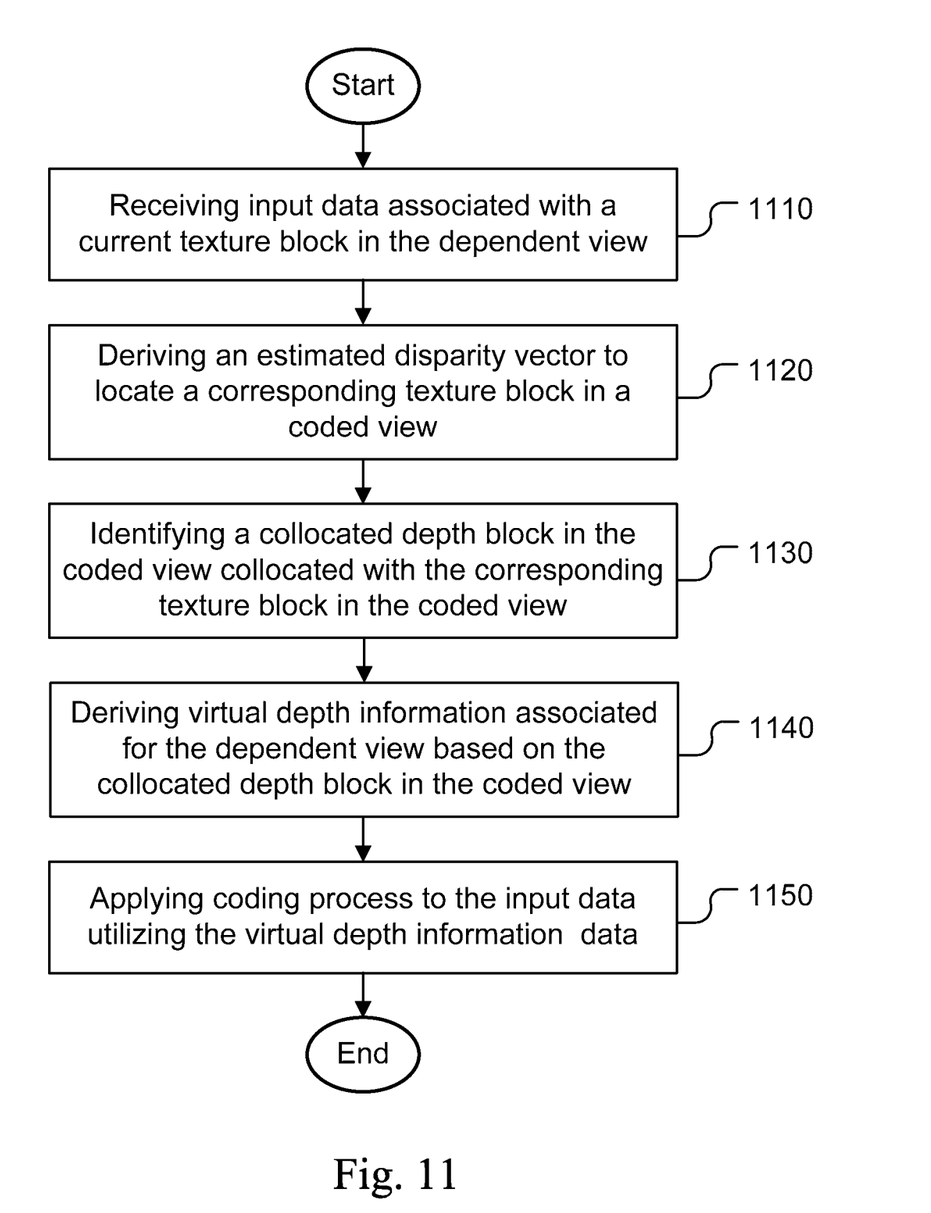
FIG. 11 illustrates a flow chart for a coding system incorporating the virtual depth information according to the present invention.

FIG. 11 illustrates an exemplary flowchart of a three-dimensional encoding or decoding system incorporating the use of virtual depth information according to an embodiment of the present invention. The system receives input data associated with a current texture block in the dependent view as shown in step 1110. For encoding, the input data associated with a current texture or depth block corresponds to original pixel data or depth data to be coded. In the case of inter-view residual prediction, the input data associated with the current texture block may correspond to residual pixel data or depth data to be inter-view predicted, or the reconstructed pixel data in the coded view for calculating the residual. For decoding, the input data corresponds to coded data associated with the current texture or depth block. The input data may be retrieved from storage such as a computer memory, buffer (RAM or DRAM) or other media. The input data may also be received from a processor such as a controller, a central processing unit, a digital signal processor or electronic circuits that produce the first data. An estimated disparity vector is derived to locate a corresponding texture block in a coded view as shown in step 1120. A collocated depth block in the coded view collocated with the corresponding texture block in the coded view is identified in step 1130. Virtual depth information associated for the dependent view is derived based on the collocated depth block in the coded view as shown in step 1140. Coding process is then applied to the input data using the virtual depth information as shown in step 1150.

The flowchart shown above is intended to illustrate an example of inter-view prediction based on the disparity vector derived from an associated depth block. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for three-dimensional or multi-view video encoding or decoding of texture data in a dependent view, the method comprising:
   receiving input data associated with a current texture block in the dependent view;
   deriving an estimated disparity vector from a plurality of disparity vector candidates by:
      selecting an initial disparity vector from the plurality of disparity vector candidates to retrieve a depth reference block in a coded view;
      extracting a second disparity vector from the depth reference block, wherein the second disparity vector points to a first location in the dependent view from the corresponding texture block in the coded view;
      determining at least one parameter associated with the initial disparity vector and the second disparity vector; and
      selecting one disparity vector candidate from the plurality of disparity vector candidates as the estimated disparity vector based on the at least one parameter;
   identifying a collocated depth block in the coded view collocated with the corresponding texture block in the coded view;
   deriving virtual depth information for the dependent view based on the collocated depth block in the coded view; and
   applying coding process to the input data utilizing the virtual depth information.

2. The method of claim 1, wherein said deriving the estimated disparity vector is based on disparity vector candidates for the current texture block in the dependent view.

3. The method of claim 2, wherein the disparity vector candidates are derived from one or more spatial or temporal neighboring blocks of the current texture block in the dependent view, or one or more spatial or temporal neighboring blocks of a temporal collocated texture block corresponding to the current texture block, wherein the spatial or temporal neighboring blocks are disparity compensation predicted (DCP) blocks, or disparity vector motion compensated predicted (DV-MCP) blocks.

4. The method of claim 3, wherein the disparity vector candidate corresponds to an average, maximum, minimum, or median of all disparity vectors or a portion of disparity vectors in said one or more spatial or temporal neighboring blocks.

5. The method of claim 2, wherein the disparity vector candidates are derived from a coded global geometry model of the dependent view.

6. The method of claim 2, wherein the estimated disparity vector is determined from the disparity vector candidates according to a priority or correlation of the disparity vector candidates.

7. The method of claim 2, wherein if a first disparity vector candidate associated with a upper-left neighboring block is more similar to a second disparity vector candidate associated with an upper neighboring block than a third disparity vector candidate associated with a left neighboring block, the second disparity vector candidate is selected as the estimated disparity vector; and otherwise, the third disparity vector candidate is selected as the estimated disparity vector.

8. The method of claim 2,
   wherein the at least one parameter is a consistency error between the initial disparity vector and the second disparity vector; and
   wherein the selected one disparity vector results in a minimal consistency error as the estimated disparity vector.

9. The method of claim 8, wherein the consistency error corresponds to a difference between the initial disparity vector and the second disparity vector or a distance between the first location and a center location of the current texture block.

10. The method of claim 2, wherein derivation process of the estimated disparity vector comprises:
   retrieving a depth reference block in the coded view corresponding to one disparity vector candidate;
   extracting a converted disparity vector from the depth reference block;

determining consistency error between the converted disparity vector and said one disparity vector candidate; and selecting one converted disparity vector with a minimal consistency error as the estimated disparity vector.

11. The method of claim 1, wherein a syntax element is signaled to indicate whether the virtual depth information associated with the texture data in the dependent view is used.

12. The method of claim 1, further comprising:
partitioning the current block into sub-blocks;
deriving a sub-block disparity vector from the virtual depth for each sub-block;
obtaining an inter-view reference sub-block according to the sub-block disparity vector for each sub-block; and
applying inter-view predictive coding to each sub-block using a corresponding inter-view reference sub-block.

13. The method of claim 12, wherein the sub-block disparity vector is converted from virtual depth values of a corresponding sub-block.

14. The method of claim 13, wherein the sub-block disparity vector corresponds to an average, maximum, minimum, or median of all or a portion of virtual depth values of the corresponding sub-block.

15. The method of claim 1, wherein a motion vector predictor or a disparity vector predictor derived from the virtual depth information is used for encoding or decoding of the current texture block coded in Merge mode or Skip mode.

16. The method of claim 1, wherein one disparity vector derived from the virtual depth information is used for generating a temporal inter-view motion vector merging candidate for the current texture block coded in Merge mode or Skip mode.

17. The method of claim 1, wherein first partition of the current texture block or a current depth block is inherited or derived based on the virtual depth information.

18. The method of claim 1, wherein the virtual depth information is used to derive a reference block for coding the current texture block or a current depth block using inter-view motion compensation.

19. The method of claim 1, wherein the virtual depth information is used to derive one disparity vector for inter-view motion prediction of the current texture block or a current depth block.

20. The method of claim 19, wherein a motion vector predictor is retrieved using the disparity vector derived from the virtual depth information to refer to a motion vector in the coded view.

21. The method of claim 1, wherein an inter-view disparity vector is retrieved from the virtual depth information for inter-view residual prediction of residual data associated with the current texture block or a current depth block.

22. An apparatus for three-dimensional or multi-view video encoding or decoding of texture data in a dependent view, the apparatus comprising:
one or more electronic circuits, wherein said one or more electronic circuits are configured to:
receive input data associated with a current texture block in the dependent view;
derive an estimated disparity vector from a plurality of disparity vector candidates by:
selecting an initial disparity vector from the plurality of disparity vector candidates to retrieve a depth reference block in a coded view;
extracting a second disparity vector from the depth reference block, wherein the second disparity vector points to a first location in the dependent view from the corresponding texture block in the coded view;
determining at least one parameter associated with the initial disparity vector and the second disparity vector; and
selecting one disparity vector candidate from the plurality of disparity vector candidates as the estimated disparity vector based on the at least one parameter;
identify a collocated depth block in the coded view collocated with the corresponding texture block in the coded view;
derive virtual depth information for the dependent view based on the collocated depth block in the coded view; and
apply coding process to the input data utilizing the virtual depth information.

\* \* \* \* \*